O. TÅNGRING.
CABLE CONNECTION.
APPLICATION FILED JUNE 13, 1906.
949,921.
Patented Feb. 22, 1910.
2 SHEETS—SHEET 1.
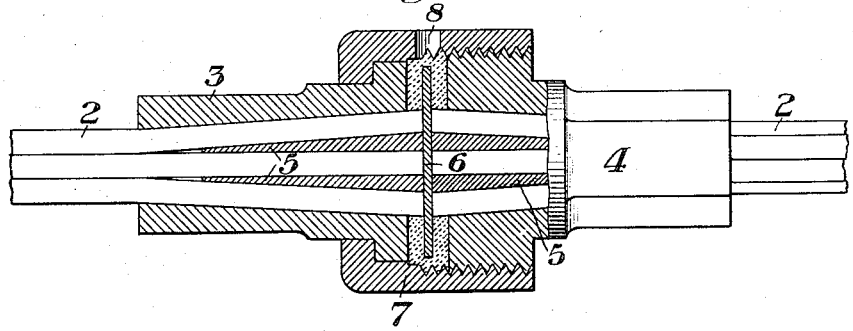
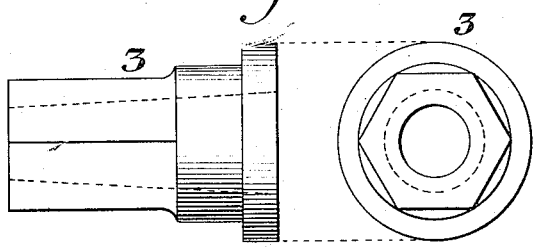
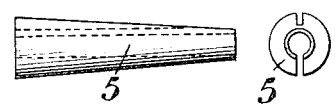
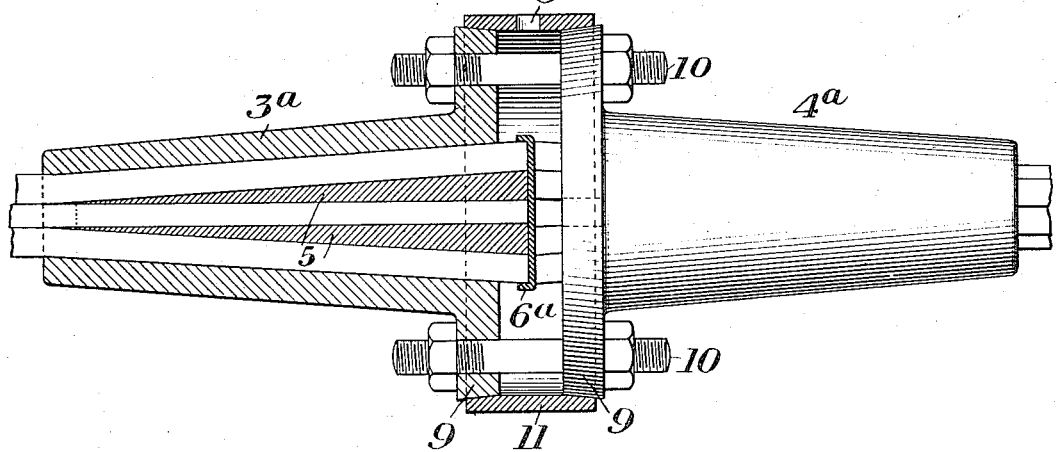
WITNESSES
INVENTOR

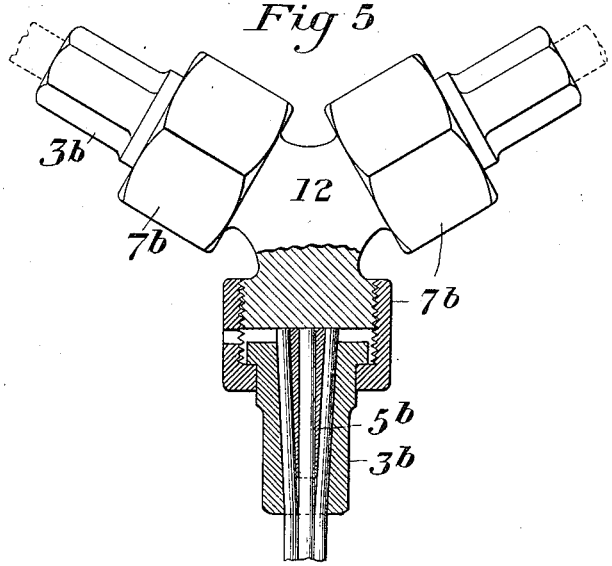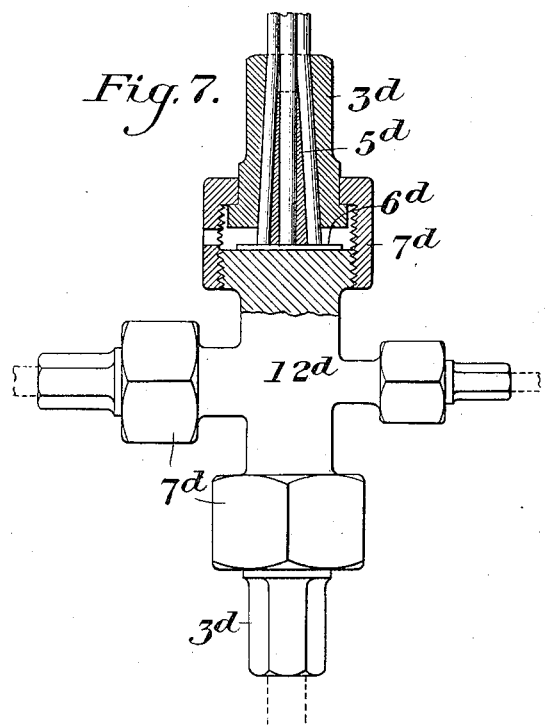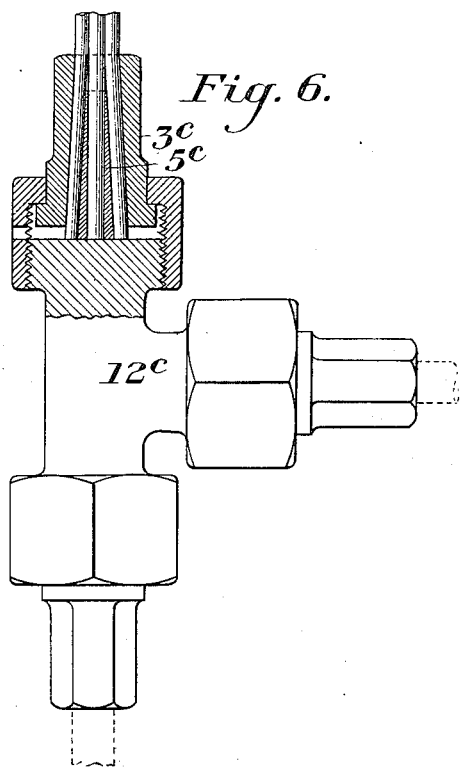

UNITED STATES PATENT OFFICE.

OLOF TÅNGRING, OF WORCESTER, MASSACHUSETTS, ASSIGNOR TO AMERICAN STEEL & WIRE COMPANY, OF WORCESTER, MASSACHUSETTS, A CORPORATION OF NEW JERSEY.

CABLE CONNECTION.

949,921.   Specification of Letters Patent.   Patented Feb. 22, 1910.

Application filed June 13, 1906. Serial No. 321,496.

*To all whom it may concern:*

Be it known that I, OLOF TÅNGRING, of Worcester, Worcester county, Massachusetts, have invented a new and useful Cable Connection, of which the following is a full, clear, and exact description, reference being had to the accompanying drawings, forming part of this specification, in which—

Figure 1 is a vertical longitudinal section showing one of my improved joints or connections; Figs. 2 and 3 are detail views of parts of the joint; Fig. 4 is a view similar to Fig. 1 showing another form of the joint for larger cables; and Figs. 5, 6 and 7 show different forms of three-way and four-way connectors.

My invention relates to the connectors designed for carrying electric current, especially high tension power currents. The connectors now used are weak in tensile strength as compared with the tensile strength of the cable itself. This requires short spans for over-head cables at the joints which increases the cost of erection.

The object of my invention is to provide a simple and effective connector which will give a joint or connection of substantially as great a tensile strength as that of the cable itself. The connection may also be used for under-ground cables or conduit cables, as the joint is efficient on account of low resistance, and the ease and rapidity with which it may be made as well as from its strength. The joint may also be used for cables employed for other purposes than transmitting electric current.

In the drawings referring to the form of Figs. 1, 2 and 3, 2, 2 represent the end portions of cables built up of strands each composed of a suitable number of copper wires. Over each end is slipped the couplings or sleeves 3 and 4 which are preferably of phosphor bronze, and are provided with tapered holes which enlarge toward the butt joint. Into the end of each cable is then driven the wedge shape ring 5 which preferably fits around the central strand and within the outer strands. These rings may be of steel or hard bronze and they serve to force the outer strands against the sleeves 3 and 4 with great pressure. After the ends of the cables are thus prepared, the disk 6 which is preferably of soft annealed copper is introduced between the ends of the cable.
This disk fits against the ends of the copper strands, the wedge rings being driven in sufficiently far to allow this, and the clamping nut 7 is then slipped over the sleeve 3 and screwed upon the sleeve 4. For this purpose one of the sleeves is provided with a shoulder fitting an inner shoulder on the clamping sleeve, while the other sleeve is externally screw-threaded to receive the internal screw thread of the clamping nut.
Both sleeves 3 and 4 are provided with flattened portions to receive a wrench which are preferably of hexagonal form, and the sleeve is turned with a wrench to give sufficient pressure so that the copper disk will be put under a substantial compression. This compression may be made equal to or more than the tensile or breaking strength of the cable. By this arrangement, when the cable is suspended or is under strain, the joint is prevented from pulling apart, since it is as strong or stronger than the cable.

The connectors are also well adapted for soft copper low tension cables, which are laid under ground or in conduits. In such case the parts may be made lighter and less expensive, and the space between the copper disk and the rings 3 and 4 may be filled with soft solder introduced through a hole 8 in the clamping nut or sleeve after the connector is coupled. This soft solder or composition will exclude air and moisture from the joint, and it may also be done in the case of the suspended cables. This filling, however, is not necessary for holding the joint, this being carried out mechanically by the sleeves and clamping nuts.

In Fig. 4 I show another form of the invention adapted for large connections requiring more pressure than can be applied by the single nut of the first form. In this case the tapered sleeves 3ª and 4ª are provided with flanges 9 which are drawn toward each other by bolts 10 of which there may be any desirable number, say from four to eight. In this case the outer edges of the flanges are preferably tapered inwardly toward each other to receive the copper ring 11 which is provided with a double taper on its inner face. This ring will be clamped by the same pressure applied in forcing the joint together, and acts to protect the joint and also serves as a conductor. The space between the flanges may in this case also be filled with solder through the hole 8ª. In this case I have shown the copper disk as having annular ribs around its rim or edge portion which center it on the cable face.

In Fig. 5, a three-way or Y-shape connection is shown which is specially suitable for transformer work. In this case, I use instead of the copper disk a phosphor bronze casting or member 12 having three threaded necks or portions which are screw threaded to receive the clamping nuts 7$^b$. The tapered wedge rings 5$^b$ are used as before, and the collar 3 is shouldered so that it will be drawn inwardly by the clamping nut 7$^b$. The angle between the branches in this case may be of any desired amount.

In Fig. 6 I show another three-way connection which is of slightly different form than that of Fig 5.

In Fig. 7 I show a four-way connection which is of substantially the same form as that of Fig. 5, similar parts being marked with similar numerals with the letter $d$ applied. In this figure 3$^d$ is the sleeve, 5$^d$ the wedge ring, and 7$^d$ the clamping nut. 12$^d$ is the phosphor bronze casting or member having three necks or portions which are adapted to receive the clamping nuts such as shown at 7$^d$. 6$^d$ is the soft copper disk which is compressed between the end of each cable and the corresponding end of the phosphor bronze member 12$^d$.

In all of the forms the holes may be provided for pouring a soft alloy or solder into the joint.

The advantages of my invention will be apparent to those skilled in the art. The joint may be made easily and rapidly. It gives great strength owing to the forcing out of the cable ends by the wedge rings. The sleeves cannot be pulled off owing to the taper, and heavy pressure can thus be applied. The nut and the bolts apply a pressure giving an efficient joint which may be made as strong as or stronger than the cable itself.

The material of the several parts may be varied, the joint may be used for any kind of cable whether for carrying electric current or not, the copper disk may or may not be used as desired, though some spacing devices should be employed between the ends of the cables. The means for drawing the ends together may be varied, the expanding wedge may be annular or of other form, and many changes may be made without departing from my invention.

I claim:—

A connector for multiple strand electric cables comprising a plurality of sleeves having tapered bores arranged to receive the ends of the cable, wedging rings having tapered peripheries arranged to receive the central strand of the cable and spread the outer strands against said tapered bores, the ends of the strands and rings projecting beyond the planes of the inner adjacent ends of said sleeves, a spacer of conductor material arranged between the ends of the cable and with which both the strands and the inner ends of said rings engage, and means disposed beyond the bore of the sleeves for drawing the two sleeves toward each other and at the same time forcing the ends of the strands and rings into close contact with said spacer.

In testimony whereof, I have hereunto set my hand.

OLOF TÅNGRING.

Witnesses:
Wm. A. Bacon,
A. F. Backlin.